US012747375B2

(12) United States Patent
Akamatsu et al.

(10) Patent No.: US 12,747,375 B2

(45) Date of Patent: Sep. 29, 2026

(54) ELECTRICAL DEBONDING ADHESIVE SHEET, JOINED BODY, AND METHOD FOR SEPARATING JOINED BODY

(71) Applicant: NITTO DENKO CORPORATION, Ibaraki (JP)

(72) Inventors: Kaori Akamatsu, Ibaraki (JP); Mika Takashima, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 1098 days.

(21) Appl. No.: 17/633,002

(22) PCT Filed: Aug. 7, 2020

(86) PCT No.: PCT/JP2020/030435

§ 371 (c)(1),
(2) Date: Feb. 4, 2022

(87) PCT Pub. No.: WO2021/029379

PCT Pub. Date: Feb. 18, 2021

(65) Prior Publication Data

US 2022/0282125 A1 Sep. 8, 2022

(30) Foreign Application Priority Data

Aug. 9, 2019 (JP) ................................ 2019-147408

(51) Int. Cl.
*C09J 7/28* (2018.01)
*C09J 5/00* (2006.01)
*C09J 7/25* (2018.01)

(52) U.S. Cl.
CPC . *C09J 7/28* (2018.01); *C09J 5/00* (2013.01); *C09J 7/255* (2018.01); *C09J 2301/124* (2020.08); *C09J 2301/314* (2020.08)

(58) Field of Classification Search
CPC ............ H01L 21/6836; C09J 2203/326; C09J 2301/502; B32B 43/006; B32B 7/025
See application file for complete search history.

(56) References Cited

U.S. PATENT DOCUMENTS 7,332,218 B1 2/2008 Gilbert
2001/0031367 A1 10/2001 Gilbert
(Continued)

FOREIGN PATENT DOCUMENTS

JP 2003-129030 A 5/2003
JP 2010-37355 A 2/2010
(Continued)

OTHER PUBLICATIONS

International Search Report issued on Oct. 27, 2020, for corresponding International Patent Application No. PCT/JP2020/030435, along with an English translation.
Written Opinion issued on Oct. 27, 2020, for corresponding International Patent Application No. PCT/JP2020/030435.
(Continued)

*Primary Examiner* — Scott R. Walshon
(74) *Attorney, Agent, or Firm* — HAUPTMAN HAM, LLP

(57) ABSTRACT

An electrical debonding adhesive sheet includes a substrate for voltage application having a conductive layer. The electrical debonding adhesive sheet also includes a first adhesive layer. The first adhesive layer includes an electrically debondable adhesive. The first adhesive layer is on the conductive layer of the substrate for voltage application. The electrical debonding adhesive sheet further includes a second adhesive layer on a surface of the substrate for voltage application opposite to the first adhesive layer. The electrical debonding adhesive sheet has, on at least one surface of the electrical debonding adhesive sheet, an electrode contact portion, which is a portion to which an adherend is not attached. A surface of the electrode contact portion to which the adherend is not attached has a portion where the con- (Continued)

ductive layer is not exposed in at least a part of the surface of the electrode contact portion.

10 Claims, 5 Drawing Sheets

(56) References Cited

U.S. PATENT DOCUMENTS

| | | | |
|---|---|---|---|
| 2008/0196828 | A1 | 8/2008 | Gilbert |
| 2008/0283415 | A1 | 11/2008 | Gilbert |
| 2010/0000878 | A1 | 1/2010 | Gilbert |
| 2018/0265750 | A1 | 9/2018 | Akamatsu et al. |
| 2018/0305593 | A1 | 10/2018 | Akamatsu et al. |
| 2019/0031929 | A1 | 1/2019 | Akamatsu et al. |
| 2022/0177734 | A1 | 6/2022 | Akamatsu et al. |
| 2024/0400866 | A1 | 12/2024 | Akamatsu et al. |

FOREIGN PATENT DOCUMENTS

| | | | | |
|---|---|---|---|---|
| JP | 2014-189672 | A | 10/2014 | |
| JP | 2017-75289 | A | 4/2017 | |
| JP | 2017-95590 | A | 6/2017 | |
| WO | 2017/064918 | A1 | 4/2017 | |
| WO | WO-2017064925 | A1 * | 4/2017 | ............. B32B 27/00 |

OTHER PUBLICATIONS

Chinese Office Action issued on Jan. 18, 2024 for corresponding Chinese Patent Application No. 202080056001.1, along with an English machine translation (12 pages).

Office Action issued on Dec. 14, 2023 for corresponding Korean Patent Application No. 10-2022-7003956, along with an English machine translation (9 pages).

Final Office Action dated Jul. 10, 2024 for corresponding Korean Patent Application No. 10-2022-7003956, along with an English translation (6 pages).

Office Action issued on Aug. 27, 2024 for corresponding Japanese Patent Application No. 2020-135064 along with an English translation (8 pages).

Office Action dated Sep. 30, 2024 for corresponding Chinese Patent Application No. 202080056001.1, along with an English Translation (14 pages).

Japanese Office Action issued on Apr. 8, 2025, in connection with the Japanese Patent Application No. 2020-135064, with its English translation, 5 pages.

Japanese Office Action issued on Jan. 13, 2026, in connection with the Japanese Patent Application No. 2024-225352, with its English machine translation (5 pages).

Office Action dated May 12, 2026, for the corresponding Japanese Patent Application No. 2024-225352, along with an English machine translation (Total 5 pages).

* cited by examiner

ELECTRICAL DEBONDING ADHESIVE SHEET, JOINED BODY, AND METHOD FOR SEPARATING JOINED BODY

CROSS REFERENCE TO RELATED APPLICATION

This application is a National Stage of International Application No. PCT/JP2020/030435, filed on Aug. 7, 2020, which designates the United States and was published in Japan, and which is based upon and claims priority to Japanese Patent Application No. 2019-147408, filed on Aug. 9, 2019 in the Japan Patent Office. All of the aforementioned applications are hereby incorporated by reference in their entireties.

TECHNICAL FIELD

The present invention relates to an electrical debonding type adhesive sheet, a joined body, and a method for separating the joined body.

BACKGROUND ART

There are growing demands regarding, for example, reworking for improving yield in electronic-component manufacturing steps and the like, and recycling for disassembling and recovering components after use. In order to meet such demands, a double-sided adhesive sheet having certain adhesive force and certain debonding properties is sometimes utilized for joining members in electronic-component manufacturing steps and the like.

Known as a double-sided adhesive sheet combining adhesive force and debonding properties is an adhesive sheet (electrical debonding type adhesive sheet) which includes an electrical debonding type adhesive layer constituted of an electrically debondable adhesive composition and which undergoes debonding upon voltage application to the adhesive layer (Patent Literature 1).

CITATION LIST

Patent Literature

Patent Literature 1: International Publication WO 2017/064925

SUMMARY OF INVENTION

Technical Problem

As shown in FIG. 1, an electrical debonding type adhesive sheet 1 typically includes a portion (an electrode contact portion 4) that is not used for allowing adherends 2 and 3 to bond to each other. An electrode is brought into contact with the electrode contact portion 4, and a voltage is applied to the electrical debonding type adhesive layer to perform electrical debonding. FIG. 2 is an enlarged side view of a periphery of the electrode contact portion 4 in FIG. 1. Typically, in the electrode contact portion 4, a conductive layer **6*a* is exposed such that the electrode can be brought into contact with the conductive layer 6*a* of a substrate 6. When the electrode is brought into contact with the exposed conductive layer 6*a* and an adherend 2 attached to the side of the electrical debonding type adhesive layer 5 and a voltage is applied to the electrical debonding type adhesive layer 5, an adhesive force of the electrical debonding type adhesive layer 5** is weakened, such that debonding can be easily performed.

However, there has been a problem in that the exposed conductive layer **6*a* in the electrode contact portion 4 comes into contact with the outside air and corrodes, the voltage cannot be applied to the electrical debonding type adhesive layer 5** and the electrical debonding cannot be performed, in some cases.

The present invention has been conceived under such circumstances, and an object of the present invention is to provide an electrical debonding type adhesive sheet in which corrosion of a conductive layer at an electrode contact portion is suppressed or prevented.

In addition, another object of the present invention is to provide a joined body having good electrical debonding properties, and a method for separating such a joined body.

Solution to Problem

As a result of intensive studies, the present inventors have found that the above object can be achieved by an electrical debonding type adhesive sheet or a joined body having a specific configuration.

A first electrical debonding type adhesive sheet of the present invention for solving the above problems is an electrical debonding type adhesive sheet comprising, a substrate for voltage application comprising a conductive layer; a first adhesive layer comprising an electrically debondable adhesive, the first adhesive layer being formed on the conductive layer of the substrate for voltage application; and a second adhesive layer formed on a surface of the substrate for voltage application opposite to the first adhesive layer, wherein the electrical debonding type adhesive sheet has, on at least one surface of the electrical debonding type adhesive sheet, an electrode contact portion, which is a portion to which an adherend is not attached, and a surface of the electrode contact portion to which the adherend is not attached has a portion where the conductive layer is not exposed in at least a part of the surface of the electrode contact portion.

In one embodiment of the first electrical debonding type adhesive sheet of the present invention, the conductive layer may not be exposed on the entire surface of the electrode contact portion to which the adherend is not attached.

In one embodiment of the first electrical debonding type adhesive sheet of the present invention, the surface of the electrode contact portion to which the adherend is not attached may be a surface on the first adhesive layer side, and the unexposed portion of the conductive layer may be covered with the first adhesive layer.

In one embodiment of the first electrical debonding type adhesive sheet of the present invention, the substrate for voltage application may further include a coating layer, and the unexposed portion of the conductive layer may be covered with the coating layer.

A second electrical debonding type adhesive sheet of the present invention is an electrical debonding type adhesive sheet comprising: a substrate for voltage application comprising a conductive layer; a first adhesive layer comprising an electrically debondable adhesive, the first adhesive layer being formed on the conductive layer of the substrate for voltage application; and a second adhesive layer formed on a surface of the substrate for voltage application opposite to the first adhesive layer, wherein the conductive layer is not exposed on an entire surface on the first adhesive layer side and an entire surface on the second adhesive layer side.

A first joined body of the present invention is a joined body comprising: an electrical debonding type adhesive sheet comprising, a substrate for voltage application comprising a conductive layer, a first adhesive layer comprising an electrically debondable adhesive, the first adhesive layer being formed on the conductive layer of the substrate for voltage application, and a second adhesive layer formed on a surface of the substrate for voltage application opposite to the first adhesive layer; a first adherend attached to the first adhesive layer of the electrical debonding type adhesive sheet; and a second adherend attached to the second adhesive layer of the electrical debonding type adhesive sheet, wherein at least a portion of the first adherend to which the first adhesive layer is attached has conductivity, and the electrical debonding type adhesive sheet has, on at least one surface of the electrical debonding type adhesive sheet, an electrode contact portion, which is a portion to which an adherend is not attached, and a surface of the electrode contact portion to which the adherend is not attached has a portion where the conductive layer is not exposed in at least a part of the surface of the electrode contact portion.

In one embodiment of the first joined body of the present invention, the conductive layer may not be exposed on the entire surface of the electrode contact portion to which the adherend is not attached.

In one embodiment of the first joined body of the present invention, the surface of the electrode contact portion to which the adherend is not attached may be a surface on the first adhesive layer side, and the unexposed portion of the conductive layer may be covered with the first adhesive layer.

In one embodiment of the first joined body of the present invention, the substrate for voltage application may further include a coating layer, and the unexposed portion of the conductive layer may be covered with the coating layer.

A method for separating a first joined body of the present invention is A method for separating the first joined body, the method comprising: in the portion of the surface of the electrode contact portion to which the adherend is not attached and where the conductive layer is not exposed, allowing an electrode to penetrate through a layer covering the conductive layer to bring the electrode into contact with the conductive layer, and applying a voltage to the first adhesive layer.

A second joined body of the present invention is a joined body comprising: an electrical debonding type adhesive sheet comprising, a substrate for voltage application comprising a conductive layer, a first adhesive layer comprising an electrically debondable adhesive, the first adhesive layer being formed on the conductive layer of the substrate for voltage application, and a second adhesive layer formed on a surface of the substrate for voltage application opposite to the first adhesive layer; a first adherend attached to the first adhesive layer of the electrical debonding type adhesive sheet; and a second adherend attached to the second adhesive layer of the electrical debonding type adhesive sheet, wherein at least a portion of the first adherend to which the first adhesive layer is attached has conductivity, and the first adherend is attached to an entire surface of the electrical debonding type adhesive sheet on the first adhesive layer side, and the second adherend is attached to the entire surface of the electrical debonding type adhesive sheet on the second adhesive layer side.

A method for separating a second joined body of the present invention is a method for separating the second joined body, the method comprising: allowing an electrode to penetrate through the first adherend or the second adherend to bring the electrode into contact with the conductive layer and applying a voltage to the first adhesive layer.

A third joined body of the present invention is a joined body comprising: an electrical debonding type adhesive sheet comprising, a substrate for voltage application comprising conductive layers on both surfaces of a first adhesive layer comprising an electrically debondable adhesive, and second adhesive layers formed on a surface of the substrate for voltage application opposite to the first adhesive layer; a first adherend attached to one second adhesive layer of the electrical debonding type adhesive sheet; and a second adherend attached to the other second adhesive layer of the electrical debonding type adhesive sheet, wherein the electrical debonding type adhesive sheet has, on at least one surface of the electrical debonding type adhesive sheet, an electrode contact portion, which is a portion to which an adherend is not attached, and a surface of the electrode contact portion to which the adherend is not attached has a portion where the conductive layer is not exposed in at least a part of the surface of the electrode contact portion.

A method for separating a third joined body of the present invention is a method for separating the third joined body, the method comprising: allowing an electrode to penetrate through the first adherend or the second adherend to bring the electrode into contact with at least one of the conductive layers and applying a voltage to the first adhesive layer.

Advantageous Effects of Invention

In an electrical debonding type adhesive sheet of the present invention, corrosion of a conductive layer at an electrode contact portion is suppressed or prevented. In addition, a joined body of the present invention has good electrical debonding properties.

DESCRIPTION OF EMBODIMENTS

Hereinafter, embodiments for carrying out the present invention are described in detail. The present invention is not limited to the embodiments to be described below.

[Adhesive Sheet]

Figure 3:
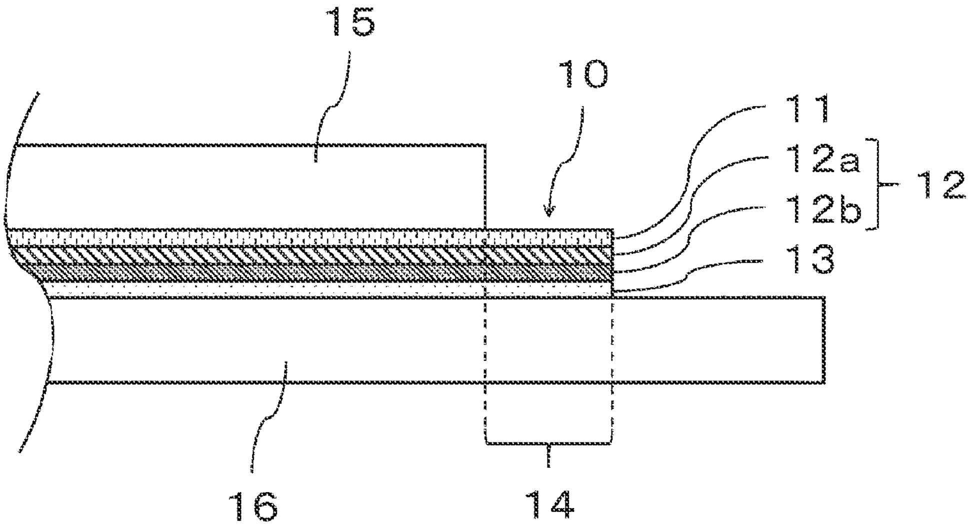
FIG. 3 is an enlarged schematic side view of a periphery of an electrode contact portion in a joined body in which adherends are allowed to bond to each other by an electrical debonding type adhesive sheet according to an embodiment of the present invention.

FIG. 3 represents an enlarged side view of a periphery of an electrode contact portion 14 in a joined body in which adherends (a first adherend 15 and a second adherend 16) are allowed to bond to each other by an electrical debonding type adhesive sheet 10 (hereinafter, also simply referred to as "adhesive sheet 10") of the present embodiment.

The adhesive sheet 10 of the present embodiment includes a substrate for voltage application 12 including a conductive layer **12*a*, a first adhesive layer 11 that includes an electrically debondable adhesive and is formed on the conductive layer 12*a* of the substrate for voltage application 12, and a second adhesive layer 13 formed on a surface of the substrate for voltage application 12 opposite to the first adhesive layer 11. In addition, the adhesive sheet 10 of the present embodiment has, on at least one surface of the adhesive sheet 10, an electrode contact portion 14 which is a portion to which an adherend is not attached. A surface of the electrode contact portion 14 to which the adherend is not attached (the surface on the first adhesive layer 11 side in the example of FIG. 3) has, in at least a part of the surface of the electrode contact portion 14 to which the adherend is not attached, a portion in which the conductive layer 12*a*** is not exposed.

(First Adhesive Layer)

The first adhesive layer 11 is an adhesive layer (electrical debonding type adhesive layer) comprising an electrically debondable adhesive, and contains a polymer as an adhesive and an electrolyte.

Examples of the polymer contained in the first adhesive layer 11 include an acrylic polymer, a rubber-based polymer, a vinyl alkyl ether-based polymer, a silicon-based polymer, a polyester-based polymer, a polyamide-based polymer, a urethane-based polymer, a fluorine-based polymer, and an epoxy-based polymer. In addition, the first adhesive layer 11 may contain only one kind of polymer, or may contain two or more kinds of polymers.

From the viewpoint of cost reduction and high productivity, the polymer preferably contains an acrylic polymer. The acrylic polymer is a polymer containing a monomer unit derived from an alkyl acrylate and/or an alkyl methacrylate as a main monomer unit, in which the monomer unit is contained at the largest mass ratio. Hereinafter, "(meth) acryl" represents "acryl" and/or "methacryl".

When the first adhesive layer 11 contains an acrylic polymer, the acrylic polymer preferably contains a monomer unit derived from an alkyl (meth)acrylate having an alkyl group having 1 to 14 carbon atoms. Examples of the alkyl (meth)acrylate include methyl (meth)acrylate, ethyl (meth) acrylate, propyl (meth)acrylate, isopropyl (meth)acrylate, n-butyl (meth)acrylate, sec-butyl (meth)acrylate, 1,3-dimethylbutyl acrylate, pentyl (meth)acrylate, isopentyl (meth) acrylate, hexyl (meth)acrylate, 2-ethylbutyl (meth)acrylate, heptyl (meth)acrylate, n-octyl (meth)acrylate, isooctyl (meth)acrylate, 2-ethylhexyl (meth)acrylate, n-nonyl (meth) acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate. Among these, n-butyl (meth)acrylate, sec-butyl (meth)acrylate, n-octyl (meth)acrylate, isooctyl (meth)acrylate, 2-ethylhexyl (meth)acrylate, n-nonyl (meth)acrylate, and isononyl (meth)acrylate are preferable. In addition, one kind of alkyl (meth)acrylate may be used, or two or more kinds of alkyl (meth)acrylates may be used.

A proportion of the monomer unit derived from the alkyl (meth)acrylate having an alkyl group having 1 to 14 carbon atoms in the acrylic polymer is preferably 50% by mass or more, more preferably 60% by mass or more, still more preferably 70% by mass or more, and still more preferably 80% by mass or more, from the viewpoint of realizing high adhesive force for the first adhesive layer 11. That is, a proportion of the alkyl (meth)acrylate having an alkyl group having 1 to 14 carbon atoms in a total amount of raw material monomers for forming the acrylic polymer is preferably 50% by mass or more, more preferably 60% by mass or more, still more preferably 70% by mass or more, and still more preferably 80% by mass or more, from the viewpoint of realizing a high adhesive force for the first adhesive layer 11.

When the first adhesive layer 11 contains an acrylic polymer, the acrylic polymer preferably contains a monomer unit derived from a polar group-containing monomer from the viewpoint of realizing a high adhesive force for the first adhesive layer 11. Examples of the polar group-containing monomer include a carboxyl group-containing monomer, a methoxy group-containing monomer, a hydroxyl group-containing monomer, and a vinyl group-containing monomer.

Examples of the carboxyl group-containing monomer include acrylic acid, methacrylic acid, itaconic acid, maleic acid, fumaric acid, crotonic acid, isocrotonic acid, carboxyethyl (meth)acrylate, and carboxypentyl (meth)acrylate. Among these, acrylic acid and methacrylic acid are preferable. In addition, one kind of carboxyl group-containing monomer may be used, or two or more kinds of carboxyl group-containing monomers may be used.

Examples of the methoxy group-containing monomer include 2-methoxyethyl acrylate.

Examples of the hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate, (4-hydroxymethylcyclohexyl) methyl acrylate, N-methylol (meth)acrylamide, vinyl alcohol, allyl alcohol, 2-hydroxyethyl vinyl ether, 4-hydroxybutyl vinyl ether, and diethylene glycol monovinyl ether. Among these, 2-hydroxyethyl (meth)acrylate is preferable. In addition, one kind of hydroxyl group-containing monomer may be used, or two or more kinds of hydroxyl group-containing monomers may be used.

Examples of the vinyl group-containing monomer include vinyl acetate, vinyl propionate, and vinyl laurate. Among these, vinyl acetate is preferable. In addition, one kind of vinyl group-containing monomer may be used, or two or more kinds of vinyl group-containing monomers may be used.

A proportion of the monomer unit derived from the polar group-containing monomer in the acrylic polymer is preferably 0.1% by mass or more from the viewpoint of ensuring a cohesive force in the first adhesive layer 11 and preventing adhesive residue on an adherend surface after debonding of the first adhesive layer 11 from the adherend. That is, a proportion of the polar group-containing monomer in the total amount of the raw material monomers for forming the acrylic polymer is preferably 0.1% by mass or more from the viewpoint of ensuring a cohesive force and preventing adhesive residue. In addition, a proportion of the monomer unit derived from the polar group-containing monomer in the acrylic polymer is preferably 30% by mass or less from the viewpoint of appropriately exhibiting characteristics derived from the monomer unit derived from the alkyl (meth)acrylate having an alkyl group having 1 to 14 carbon atoms in the acrylic polymer. That is, the proportion of the polar group-containing monomer in the total amount of the raw material monomers for forming the acrylic polymer is preferably 30% by mass or less from the viewpoint of exhibiting the characteristics.

A method for obtaining an acrylic polymer by polymerizing a monomer as described above is not limited, and a known method can be used. Examples of the polymerization method include solution polymerization, emulsion polymerization, bulk polymerization, and suspension polymerization.

A content of the polymer in the first adhesive layer 11 is preferably 70% by mass or more, more preferably 80% by mass or more, more preferably 85% by mass or more, and still more preferably 90% by mass or more, from the viewpoint of realizing a sufficient adhesive force in the first adhesive layer 11.

The electrolyte contained in the first adhesive layer 11 is a substance that can be ionized into an anion and a cation, and examples of such an electrolyte include an ionic liquid, an alkali metal salt, and an alkaline earth metal salt. From the viewpoint of realizing good electrical debonding properties in the first adhesive layer 11, the electrolyte contained in the first adhesive layer 11 is preferably an ionic liquid. The ionic liquid is a liquid salt at room temperature (about 25° C.) and contains an anion and a cation.

When the first adhesive layer 11 contains the ionic liquid, the anion of the ionic liquid preferably contains at least one selected from the group consisting of $(FSO_2)_2N^-$, $(CF_3SO_2)_2N^-$, $(CF_3CF_2SO_2)_2N^-$, $(CF_3SO_2)_3C^-$, $Br^-$, $AlCl_4^-$, $Al_2Cl_7^-$, $NO_3^-$, $BF_4^-$, $PF_6^-$, $CH_3COO^-$, $CF_3COO^-$, $CF_3CF_2CF_2COO^-$, $CF_3SO_3^-$, $CF_3(CF_2)_3SO_3^-$, $AsF_6^-$, $SbF_6^-$, and $F(HF)_n^-$. Among these, as the anion, $(FSO_2)_2N^-$, bis(fluorosulfonyl)imide anion, and $(CF_3SO_2)_2N^-$, bis(trifluoromethanesulfonyl)imide anion, are preferable because they are chemically stable and suitable for realizing the electrical debonding properties of the first adhesive layer 11.

When the first adhesive layer 11 contains the ionic liquid, the cation of the ionic liquid preferably contains at least one selected from the group consisting of an imidazolium-based cation, a pyridinium-based cation, a pyrrolidinium-based cation, and an ammonium-based cation.

Examples of the imidazolium-based cation include 1-methylimidazolium cation, 1-ethyl-3-methylimidazolium cation, 1-propyl-3-methylimidazolium cation, 1-butyl-3-methylimidazolium cation, 1-pentyl-3-methylimidazolium cation, 1-hexyl-3-methylimidazolium cation, 1-heptyl-3-methylimidazolium cation, 1-octyl-3-methylimidazolium cation, 1-nonyl-3-methylimidazolium cation, 1-undecyl-3-methylimidazolium cation, 1-dodecyl-3-methylimidazolium cation, 1-tridecyl-3-methylimidazolium cation, 1-tetradecyl-3-methylimidazolium cation, 1-pentadecyl-3-methylimidazolium cation, 1-hexadecyl-3-methylimidazolium cation, 1-heptadecyl-3-methylimidazolium cation, 1-octadecyl-3-methylimidazolium cation, 1-undecyl-3-methylimidazolium cation, 1-benzyl-3-methylimidazolium cation, 1-butyl-2,3-dimethylimidazolium cation, and 1,3-bis(dodecyl)imidazolium cation.

Examples of the pyridinium-based cation include 1-butylpyridinium cation, 1-hexylpyridinium cation, 1-butyl-3-methylpyridinium cation, 1-butyl-4-methylpyridinium cation, and 1-octyl-4-methylpyridinium cation.

Examples of the pyrrolidinium-based cation include 1-ethyl-1-methylpyrrolidinium cation and 1-butyl-1-methylpyrrolidinium cation.

Examples of the ammonium-based cation include tetraethylammonium cation, tetrabutylammonium cation, methyltrioctylammonium cation, tetradecyltrihexylammonium cation, glycidyltrimethylammonium cation, and trimethylaminoethyl acrylate cation.

The ionic liquid in the first adhesive layer 11 is particularly preferably an ionic liquid containing $(FSO_2)_2N^-$, bis(fluorosulfonyl)imide anion, and a cation having a molecular weight of 160 or less, from the viewpoint of realizing high electrical debonding properties in the first adhesive layer 11 by using high diffusivity for the cation. Examples of the cation having a molecular weight of 160 or less include 1-methylimidazolium cation, 1-ethyl-3-methylimidazolium cation, 1-propyl-3-methylimidazolium cation, 1-butyl-3-methylimidazolium cation, 1-pentyl-3-methylimidazolium cation, 1-butylpyridinium cation, 1-hexylpyridinium cation, 1-butyl-3-methylpyridinium cation, 1-butyl-4-methylpyridinium cation, 1-ethyl-1-methylpyrrolidinium cation, 1-butyl-1-methylpyrrolidinium cation, tetraethylammonium cation, glycidyltrimethylammonium cation, and trimethylaminoethyl acrylate cation.

Examples of commercially available products of the ionic liquid contained in the first adhesive layer 11 include "ELEXCEL AS-110", "ELEXCEL MP-442", "ELEXCEL IL-210", "ELEXCEL MP-471", "ELEXCEL MP-456", and "ELEXCEL AS-804", all manufactured by Dai-ichi Kogyo Seiyaku Co., Ltd.

Examples of the alkali metal salt include LiCl, $Li_2SO_4$, $LiBF_4$, $LiPF_6$, $LiClO_4$, $LiAsF_6$, $LiCF_3SO_3$, $LiN(SO_2CF_3)_2$, $LiN(SO_2C_2F_5)_2$, $LiC(SO_2CF_3)_3$, NaCl, $Na_2SO_4$, $NaBF_4$, $NaPF_6$, $NaClO_4$, $NaAsF_6$, $NaCF_3SO_3$, $NaN(SO_2CF_3)_2$, $NaN(SO_2C_2F_5)_2$, $NaC(SO_2CF_3)_3$, KCl, $K_2SO_4$, $KBF_4$, $KPF_6$, $KClO_4$, $KAsF_6$, $KCF_3SO_3$, $KN(SO_2CF_3)_2$, $KN(SO_2C_2F_5)_2$, and $KC(SO_2CF_3)_3$.

A content of the ionic liquid in the first adhesive layer 11 is, for example, 0.1 parts by mass or more with respect to 100 parts by mass of the polymer in the first adhesive layer 11 in order to impart electrical debonding properties in the first adhesive layer 11, and is preferably 0.5 parts by mass or more, more preferably 0.6 parts by mass or more, still more preferably 0.8 parts by mass or more, particularly preferably 1.0 parts by mass or more, and most preferably 1.5 parts by mass or more from the viewpoint of realizing better electrical debonding properties. From the viewpoint of achieving a good adhesive force and good electrical debonding properties in a well-balanced manner for the first adhesive layer 11, the content of the ionic liquid in the first adhesive layer 11 is preferably 30 parts by mass or less, more preferably 20 parts by mass or less, still more preferably 15 parts by mass or less, particularly preferably 10 parts by mass or less, and most preferably 5 parts by mass or less with respect to 100 parts by mass of the polymer in the first adhesive layer 11.

The first adhesive layer 11 may contain other components as long as the effects of the present invention are not impaired. Examples of such a component include a tackifier, a silane coupling agent, a colorant, a pigment, a dye, a surface lubricant, a leveling agent, a softener, an antioxidant, an age resister, a light stabilizer, a polymerization inhibitor, an inorganic or organic filler, a metal powder, a particulate matter, a corrosion inhibitor, and a foil-like matter, and various additives in a resin composition can be used. The content of these components is determined depending on the intended use within a range that does not impair the effects of the present invention. For example, the content is 10 parts by mass or less with respect to 100 parts by mass of the polymer.

A thickness of the first adhesive layer 11 is not limited, but is preferably 1 μm or more, more preferably 3 μm or more, still more preferably 5 μm or more, particularly preferably 8 μm or more, from the viewpoint of realizing good adhesiveness in the first adhesive layer 11. In addition, from the viewpoint of reducing the applied voltage at the time of debonding the adherend, the thickness is preferably 1,000 μm or less, more preferably 500 μm or less, still more preferably 100 μm or less, particularly preferably 30 μm or less.

(Second Adhesive Layer)

The second adhesive layer 13 contains a polymer for causing the second adhesive layer 13 to exhibit adhesiveness. Components contained in the second adhesive layer 13 and the content thereof are the same as those described above with respect to the components contained in the first adhesive layer 11 and the content thereof, except for the electrolyte.

A thickness of the second adhesive layer 13 is not limited, but is preferably 1 μm or more, more preferably 3 μm or more, still more preferably 5 μm or more, particularly preferably 8 μm or more, from the viewpoint of realizing good adhesiveness in the second adhesive layer 13. In addition, the thickness is preferably 1000 μm or less, more preferably 500 μm or less, and still more preferably 100 μm or less.

(Substrate for Voltage Application)

The substrate for voltage application is not limited as long as the substrate for voltage application has a conductive layer. The substrate for voltage application may have a laminated structure including the conductive layer 12*a* and a substrate layer 12*b* as in the example shown in FIG. 3, or may have a single-layer structure including only a conductive layer 22*a* as in a modification shown in FIG. 4. In addition, the substrate for voltage application may further include a coating layer, and may have a laminated structure including a coating layer 12*c*, the conductive layer 12*a*, and the substrate layer 12*b* as in a modification shown in FIG. 7. In the modification shown in FIG. 7, a portion where the conductive layer 12*a* is not exposed may be covered with the coating layer 12*c*. In addition, the substrate for voltage application may have a laminated structure including a coating layer and a conductive layer.

The thickness of the substrate for voltage application is not limited, but in any configuration, for example, is preferably 10 μm or more, more preferably 12 μm or more, and still more preferably 25 μm or more, and for example, is preferably 1000 μm or less, more preferably 500 μm or less, still more preferably 300 μm or less, and particularly preferably 100 μm or less.

In the substrate for voltage application 12 having the laminated structure in the example shown in FIG. 3, the substrate layer 12*b* is a portion that functions as a support, and is, for example, a plastic substrate, a fiber substrate, a paper substrate, or a laminate thereof. The substrate layer 12*b* may be a single layer or multiple layers. In addition, the substrate layer 12*b* may be subjected to various treatments such as a back surface treatment, an antistatic treatment, and an undercoat treatment as necessary.

A thickness of the substrate layer 12*b* is not limited, but is preferably 10 μm or more, more preferably 12 μm or more, and still more preferably 25 μm or more, and is preferably 1000 μm or less, more preferably 500 μm or less, still more preferably 300 μm or less, and particularly preferably 100 μm or less.

The conductive layer 12*a* is a layer having conductivity, and includes, for example, a conductive material such as a metal (for example, aluminum, copper, iron, tin, gold, or an alloy thereof), a conductive polymer, a conductive metal oxide (for example, ITO), or carbon.

The conductive layer 12*a* can be formed by, for example, plating, chemical vapor deposition, sputtering, or the like.

A thickness of the conductive layer 12*a* is not limited, but is preferably 0.001 μm or more, more preferably 0.01 μm or more, still more preferably 0.03 μm or more, and particularly preferably 0.05 μm or more, and is preferably 1000 μm or less, more preferably 500 μm or less, still more preferably 300 μm or less, particularly preferably 50 μm or less, and most preferably 10 μm or less.

The coating layer 12*c* is a layer containing a resin or an inorganic substance as a main component, and can be formed of a resin composition containing a resin component as a main component or a composition containing an inorganic substance.

When the coating layer 12*c* contains a resin as a main component, examples of the resin component forming the coating layer 12*c* (resin coating layer) include an epoxy-based resin, a polyester-based resin, an acrylic-based resin, and a urethane-based resin, and these resin components can be used alone or a mixture thereof can be used.

The resin composition for forming the coating layer 12*c* (resin coating layer) containing a resin as a main component preferably contains the resin component (polymer) as a main agent.

A content of the polymer in the resin composition of the present embodiment is preferably 50% by mass or more and 99.9% by mass or less with respect to a total amount (100% by mass) of the resin composition, an upper limit is more preferably 99.5% by mass, and still more preferably 99% by mass, and a lower limit is more preferably 60% by mass, and still more preferably 70% by mass.

The resin composition may further contain a curing agent. As the curing agent, a commonly used curing agent such as an isocyanate-based curing agent, an epoxy-based curing agent, or a melamine-based curing agent can be used.

The resin composition of the present embodiment may further contain, if necessary, various additives such as a filler, a plasticizer, an age resister, an antioxidant, a pigment (a dye), a flame retardant, a solvent, a surfactant (leveling agent), a rust inhibitor, a corrosion inhibitor, and an antistatic agent. A total content of these components is not limited as long as the effects of the present invention are exhibited, but is preferably 0.01 parts by mass or more and 20 parts by mass or less, more preferably 10 parts by mass or less, and still more preferably 5 parts by mass or less with respect to 100 parts by mass of the resin.

Examples of the filler include silica, iron oxide, zinc oxide, aluminum oxide, titanium oxide, barium oxide, magnesium oxide, calcium carbonate, magnesium carbonate, zinc carbonate, agalmatolite clay, kaolin clay, and calcined clay.

As the plasticizer, known and commonly used plasticizers used in general resin compositions and the like can be used. Examples thereof include: oils such as paraffin oil and process oil; liquid rubber such as liquid polyisoprene, liquid polybutadiene, and liquid ethylene-propylene rubber; tetrahydrophthalic acid, azelaic acid, benzoic acid, phthalic acid, trimellitic acid, pyromellitic acid, adipic acid, sebacic acid, fumaric acid, maleic acid, itaconic acid, citric acid and derivatives thereof; dioctyl phthalate (DOP), dibutyl phthalate (DBP), dioctyl adipate, diisononyl adipate (DINA), and isodecyl succinate.

Examples of the age resister include hindered phenol-based or aliphatic and aromatic hindered amine-based compounds.

Examples of the antioxidant include butylhydroxytoluene (BHT) and butylhydroxyanisole (BHA).

Examples of the pigment include an inorganic pigment such as titanium dioxide, zinc oxide, ultramarine, red iron oxide, lithopone, lead, cadmium, iron, cobalt, aluminum, hydrochloride or sulfate, and an organic pigment such as an azo pigment or a copper phthalocyanine pigment.

Examples of the rust inhibitor include zinc phosphate, tannic acid derivative, phosphate, basic sulfonate, and various rust preventive pigments.

Examples of the corrosion inhibitor include a carbodiimide compound, an adsorptive inhibitor, and a chelate-forming metal deactivator, and for example, those described in Japanese Patent Application Laid-Open No. 2019-059908 can be used.

Examples of the antistatic agent include, in general, a quaternary ammonium salt or a hydrophilic compound such as polyglycolic acid or ethylene oxide derivative.

The form of the resin composition is not limited, and may be, for example, an aqueous resin composition, a solvent type resin composition, a hot-melt type resin composition, and an active energy ray-curable resin composition. Here, the aqueous resin composition refers to a resin composition in a form in which a coating layer forming component is contained in a solvent containing water as a main component (aqueous solvent), and is a concept including a water dispersion type resin composition in a form in which a component forming the coating layer is dispersed in water, and a water-soluble resin composition in a form in which a component forming the coating layer is dissolved in water.

The coating layer 12*c* (resin coating layer) containing a resin as a main component can be formed by applying a resin composition by a known technique such as gravure coating, reverse roll coating, roll coating, dip coating, or comma coating, drying the resin composition, and, if necessary, curing the resin composition by irradiation with ultraviolet rays, electron beams, and the like.

A thickness of the coating layer 12*c* (resin coating layer) containing a resin as a main component is preferably 10 nm or more and 5000 nm or less from the viewpoint of electrical debonding properties. An upper limit of the thickness of the coating layer 12*c* (resin coating layer) is more preferably 2000 nm, still more preferably 1000 μm nm, and particularly preferably 500 nm, and a lower limit thereof is more preferably 15 nm, still more preferably 20 nm, and particularly preferably 30 nm.

In addition, when the coating layer 12*c* contains an inorganic substance as a main component, examples of the inorganic substance forming the coating layer 12*c* (inorganic coating layer) include a metal, a metal alloy, a metal oxide, and a metal nitride.

Examples of the metal include silicon, aluminum, nickel, chromium, tin, gold, silver, platinum, zinc, titanium, tungsten, zirconium, and palladium.

The inorganic substance is preferably $Al_2O_3$, Ni, NiCr, or inorganic nitride or inorganic oxide having a non-stoichiometric composition, such as SiNx or SiOx.

The coating layer 12*c* (inorganic coating layer) containing an inorganic substance as a main component can be formed by sputtering, vapor deposition, or the like.

The thickness of the coating layer 12*c* (inorganic coating layer) containing an inorganic substance as a main component is preferably 1 nm or more and 1000 nm or less from the viewpoint of electrical debonding properties. The upper limit of the thickness of the coating layer 12*c* (inorganic coating layer) is more preferably 700 nm, still more preferably 500 nm, and particularly preferably 200 nm, and the lower limit thereof is more preferably 1 nm, still more preferably 20 nm, and particularly preferably 50 nm.

Figure 4:
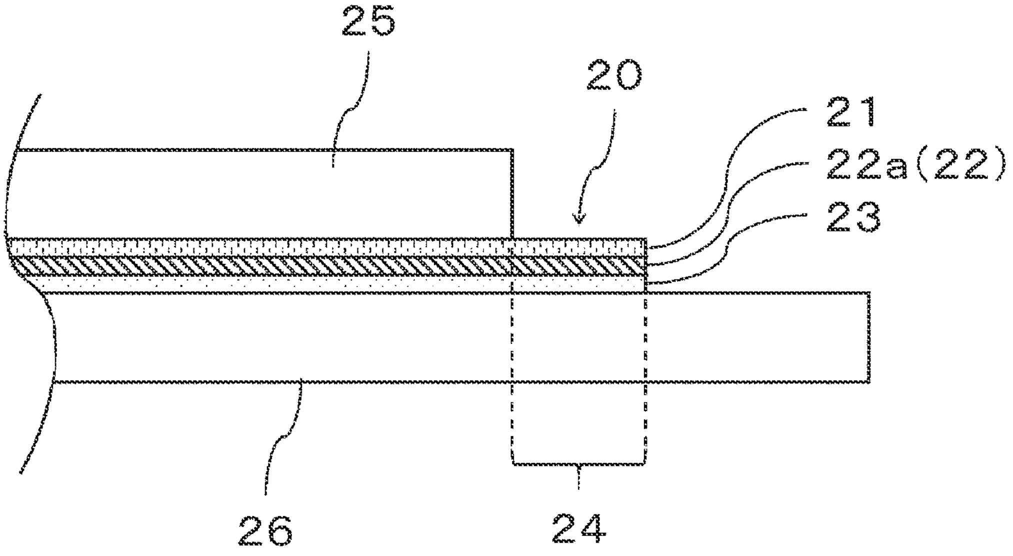
FIG. 4 is an enlarged schematic side view of a periphery of an electrode contact portion in a joined body in which adherends are allowed to bond to each other by an electrical debonding type adhesive sheet according to a modification of the embodiment of the present invention.

In the modification shown in FIG. 4, a substrate for voltage application 22 having a single-layer structure is formed of only the conductive layer 22*a*, and has both a function as a support and a function as a conductor.

(Electrode Contact Portion)

The adhesive sheet 10 of the present embodiment has, on at least one surface of the adhesive sheet 10, the electrode contact portion 14 which is a portion to which an adherend is not attached.

Figure 1:
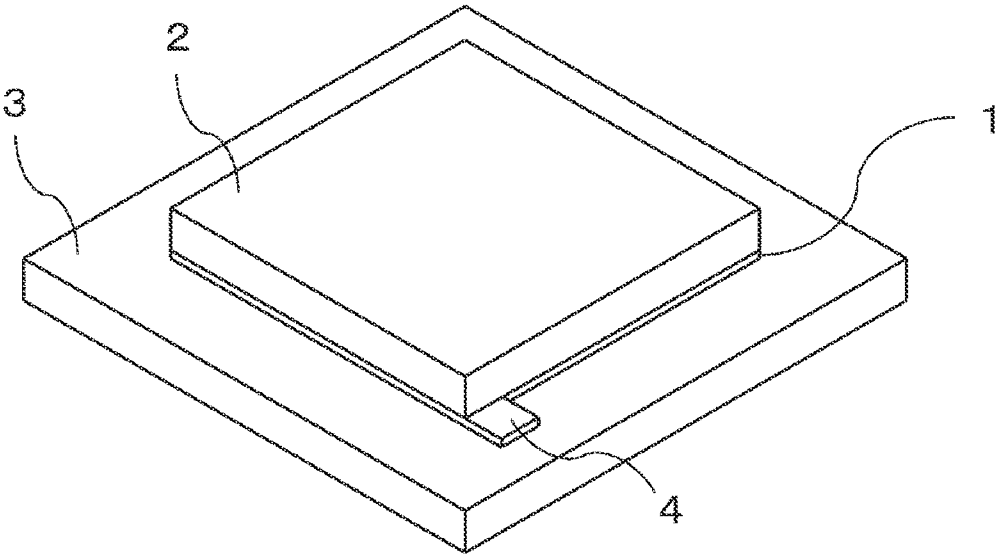
FIG. 1 is a schematic perspective view of a joined body in which adherends are allowed to bond to each other by an electrical debonding type adhesive sheet.
Figure 5:
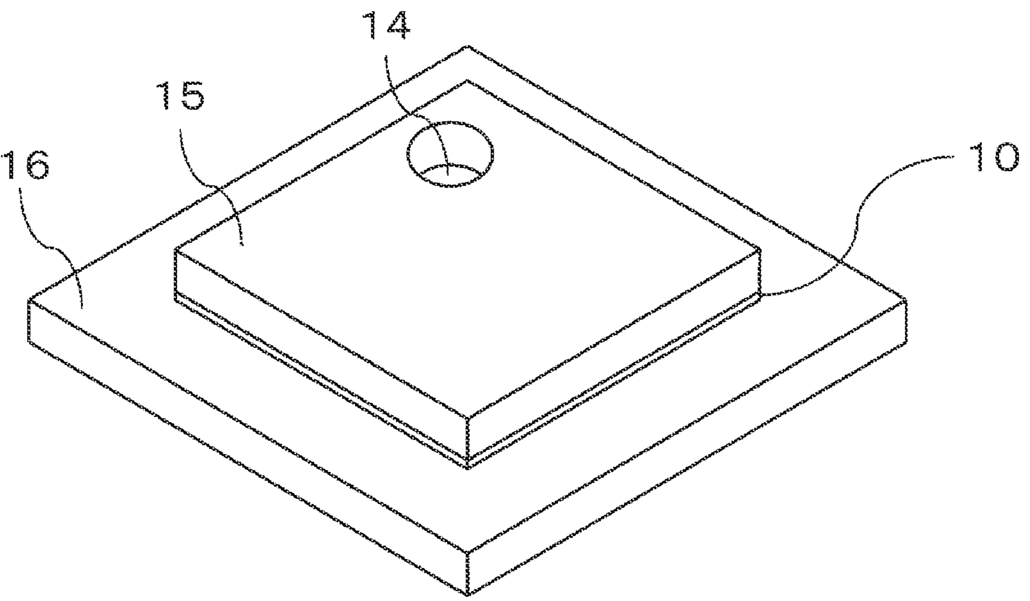
FIG. 5 is a schematic perspective view of a joined body in which adherends are allowed to bond to each other by an electrical debonding type adhesive sheet according to a modification of the embodiment of the present invention.

A shape of the electrode contact portion is not limited. For example, as in the example in the related art shown in FIG. 1, the shape may be an extended tab shape. In addition, for example, when an adherend having an opened hole is attached as shown in FIG. 5, the adherend is not attached to the opened portion of the hole, and the portion to which the adherend is not attached is the electrode contact portion 14.

The adhesive sheet 10 of the present embodiment has a portion where the conductive layer 12*a* is not exposed in at least a part of a surface (hereinafter, also referred to as an "electrode contact surface") of the electrode contact portion 14 to which the adherend is not attached.

The unexposed portion of the conductive layer 12*a* may be covered with the first adhesive layer 11 as shown in FIG. 3.

Figure 7:
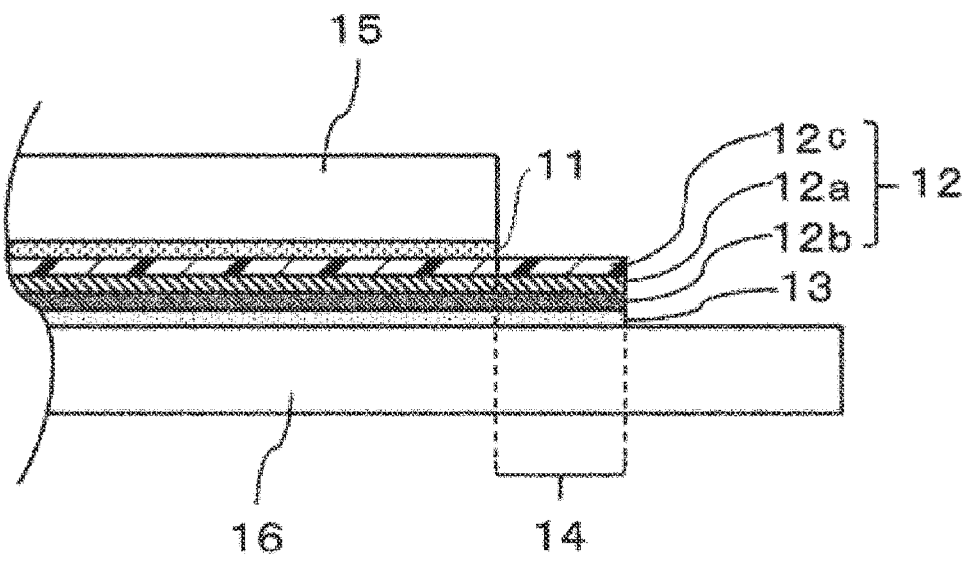
FIG. 7 is an enlarged schematic side view of a periphery of an electrode contact portion in a joined body in which adherends are allowed to bond to each other by an electrical debonding type adhesive sheet according to a modification of the embodiment of the present invention.

In addition, the unexposed portion of the conductive layer 12*a* may be covered with the coating layer 12*c* as shown in FIG. 7.

Corrosion of the conductive layer is less likely to occur in the unexposed portion of the conductive layer 12*a*, and thus, this reduces the possibility that electrical debonding cannot be performed due to corrosion of the conductive layer 12*a*, in the adhesive sheet 10 of the present embodiment. A method of bringing an electrode into contact with the conductive layer 12*a* that is not exposed and performing electrical debonding will be described later.

In the adhesive sheet 10 of the present embodiment, it is sufficient that the conductive layer 12*a* is not exposed in at least a part of the surface of the electrode contact portion 14 to which the adherend is not attached, but in order to further reduce corrosion of the conductive layer 12*a*, a ratio of an area of the portion where the conductive layer 12*a* is not exposed to an area of the electrode contact surface is preferably large. The ratio of the area of the portion where the conductive layer 12*a* is not exposed to the area of the electrode contact surface of the electrode contact portion 14 is preferably 30% or more, more preferably 50% or more, still more preferably 80% or more, and most preferably 100%. That is, the conductive layer 12*a* is preferably not exposed in the entire electrode contact surface of the electrode contact portion 14.

In addition, in the adhesive sheet 10 of the present embodiment, the conductive layer 12*a* is particularly preferably not exposed on the entire surface on the first adhesive layer 11 side and on the entire surface on the second adhesive layer 13 side from the viewpoint of reducing corrosion.

Figure 6:
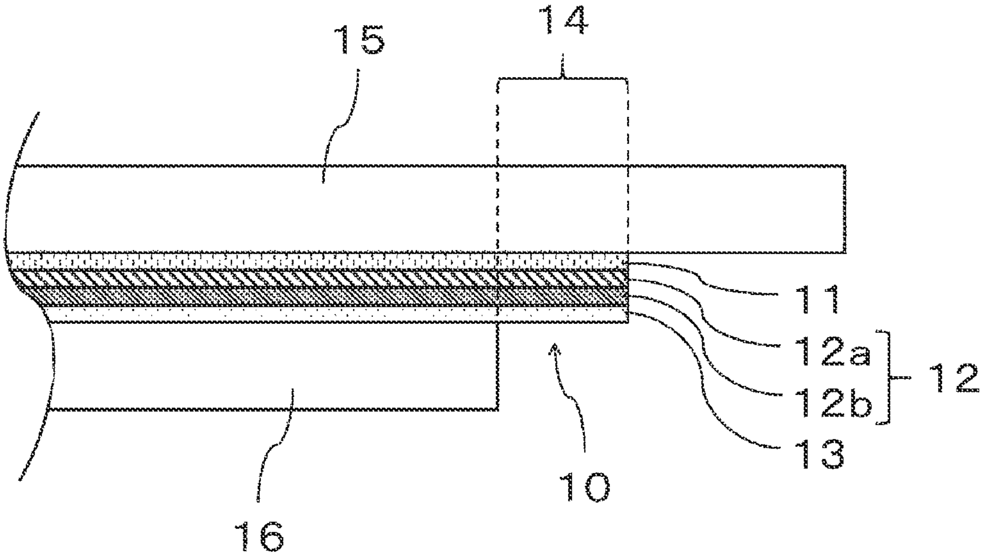
FIG. 6 is an enlarged schematic side view of a periphery of an electrode contact portion in a joined body in which adherends are allowed to bond to each other by an electrical debonding type adhesive sheet according to a modification of the embodiment of the present invention.

In the adhesive sheet 10 of the example shown in FIG. 3, the surface of the electrode contact portion 14 on the first adhesive layer 11 side is an electrode contact surface, that is, an adherend is not attached to the surface on the first adhesive layer 11 side, but as shown in FIG. 6, the surface on the second adhesive layer 13 side may be an electrode contact surface. That is, in the electrode contact portion 14, the adherend may not be attached to the surface on the second adhesive layer 13 side.

The adherend may not be attached to both the surface on the first adhesive layer 11 side and the surface on the second adhesive layer 13 side in the electrode contact portion. However, in this case, the electrode contact portion 14 is unstable, and thus it is difficult to bring the electrode into contact with the electrode contact portion 14, and it is difficult to perform electrical debonding. Therefore, as in the example shown in FIG. 3 and the example shown in FIG. 6, in the electrode contact portion 14, the adherend is preferably attached to either the surface on the first adhesive layer 11 side or the surface on the second adhesive layer 13 side.

In particular, in the adhesive sheet 10 of the present embodiment, preferably, the surface of the electrode contact portion 14 on the first adhesive layer side does not include an adherend. That is, the surface of the electrode contact portion 14 on the first adhesive layer side is an electrode contact surface.

When the electrode is brought into contact with the conductive layer in the electrode contact portion, for example, a layer covering the conductive layer 12*a* is penetrated with the electrode and the electrode is brought into contact with the conductive layer 12*a*, which will be described in detail later.

At this time, as shown in FIG. 3, when the surface on the first adhesive layer 11 side is an electrode contact surface, the electrode can be brought into contact with the conductive layer 12*a* by allowing the electrode to penetrate through only the first adhesive layer 11 covering the conductive layer 12*a*, and thus electrical debonding can be relatively easily performed.

On the other hand, when the surface on the second adhesive layer 13 side is an electrode contact surface as shown in FIG. 6, it is necessary to penetrate through at least the substrate layer 12*b* in order to bring the electrode into contact with the conductive layer 12*a*. The substrate layer 12*b* is usually relatively thick and has high strength, and thus it is not easy to allow the electrode to penetrate through the substrate layer 12*b* as compared with the case where the electrode is allowed to penetrate through the first adhesive layer 11. In addition, when the electrode penetrating through the substrate layer 12*b* penetrates through the conductive layer 12*a* and the first adhesive layer 11 and comes into contact with the first adherend 15, a voltage cannot be applied to the first adhesive layer. Therefore, fine control is required for allowing the electrode to penetrate through the substrate layer 12*b*.

The same applies to a case where the substrate for voltage application 22 has a single-layer structure including the conductive layer 22*a* as in the modification shown in FIG. 4. In this case, when the surface on the second adhesive layer side is an electrode contact surface, it is not necessary to allow the electrode to penetrate through the substrate layer when the electrode is brought into contact with the conductive layer 22*a*, but similarly, fine control is required.

Separators (debonding liners) may be provided on the surfaces of the first adhesive layer 11 and the second adhesive layer 13 of the adhesive sheet 10 of the present embodiment. The separator is an element for protecting the first adhesive layer 11 and the second adhesive layer 13 of the adhesive sheet 10 so as not to be exposed, and is debonded from the adhesive sheet 10 when the adhesive sheet 10 is attached to the adherend. The adhesive sheet 10 may be in a form in which the adhesive sheet 10 is in the state of being sandwiched between two separators, or may be in a form obtained by winding the adhesive sheet 10 and a separator into a roll such that the adhesive sheet 10 alternates with the separator. Examples of the separator include a substrate having a debonding layer, a lowly bondable substrate containing a fluoropolymer, and a lowly bondable substrate containing a nonpolar polymer. The surface of the separator may have undergone a release treatment, an antifouling treatment, or an antistatic treatment. The thickness of the separator is, for example, 5 μm to 200 μm.

Figure 8:
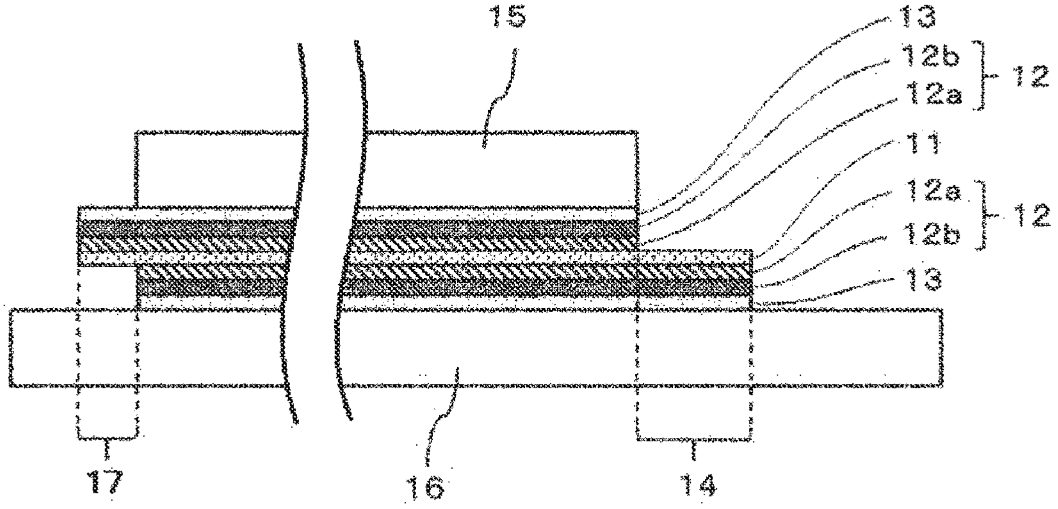
FIG. 8 is an enlarged schematic side view of a periphery of an electrode contact portion in a joined body in which adherends are allowed to bond to each other by an electrical debonding type adhesive sheet according to a modification of the embodiment of the present invention.

The electrical debonding type adhesive sheet according to the embodiment of the present invention may be a double-sided electrical debonding type adhesive sheet as in a modification shown in FIG. 8. The electrical debonding type adhesive sheet shown in FIG. 8 includes the electrode contact portion 14, which is a portion to which an adherend is not attached, on at least one surface of the electrical debonding type adhesive sheet, and has a laminated structure in which the substrate for voltage application 12 and the second adhesive layer 13 are laminated on both surfaces of the first adhesive layer 11.

In the modification shown in FIG. 8, the double-sided electrical debonding type adhesive sheet may be attached to the first adherend 15 on the surface on the side of one second adhesive layer 13, and may be attached to the second adherend 16 on the surface on the side of the other second adhesive layer 13. In addition, for example, as shown in FIG. 8, the double-sided electrical debonding type adhesive sheet according to the embodiment of the present invention may have an extending portion 17 that extends and is exposed from one side of the substrate for voltage application 12 and the adherend 15 in a surface spreading direction. In such a configuration, electrical connection between one terminal of a device to which a voltage is applied and the substrate for voltage application 12 can be easily implemented via the extending portion 17. Then, an extending direction of the extending portion 17 from one of the substrate for voltage application 12 and the adherend 15 is different from an extending direction of the electrode contact portion 14, and the extending directions are opposite directions in the present embodiment. According to such a configuration, a voltage can be appropriately and easily applied to the double-sided electrical debonding type adhesive sheet by a voltage applying device while avoiding, for example, a short circuit between the device terminals.

The unexposed portion of the conductive layer 12*a* may be covered with the first adhesive layer 11 as shown in FIG. 8. In addition, the conductive layer 12*a* in the extending portion 17 is preferably not exposed, and may be covered with the first adhesive layer 11.

Figure 9:
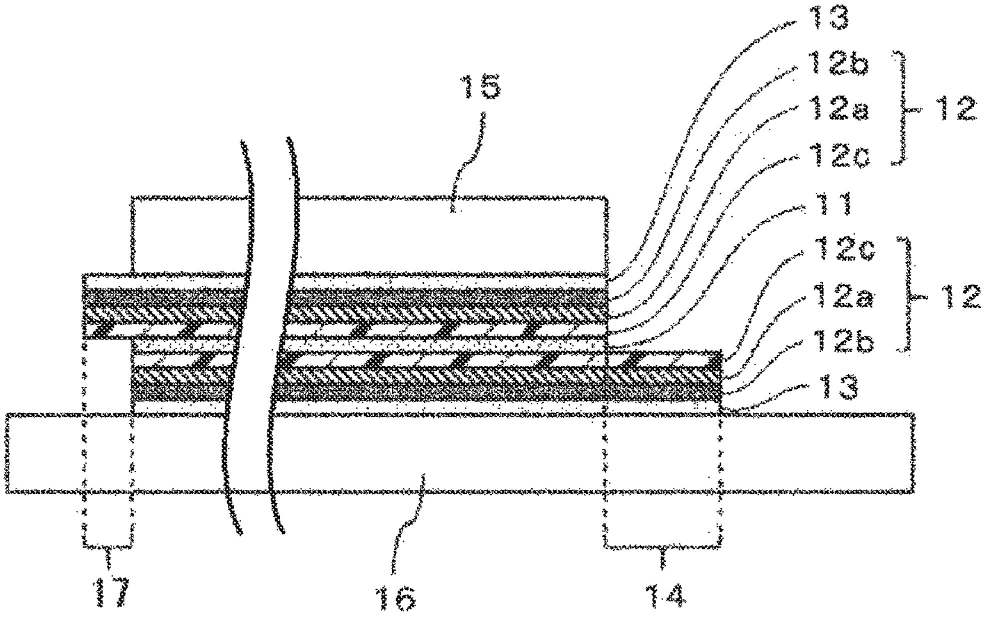
FIG. 9 is an enlarged schematic side view of a periphery of an electrode contact portion in a joined body in which adherends are allowed to bond to each other by an electrical debonding type adhesive sheet according to a modification of the embodiment of the present invention.

In addition, the electrical debonding type adhesive sheet according to the embodiment of the present invention may be a double-sided electrical debonding type adhesive sheet as in a modification shown in FIG. 9. The double-sided electrical debonding type adhesive sheet shown in FIG. 9 has a laminated structure in which the substrate for voltage application 12 and the second adhesive layer 13 are laminated on both surfaces of the first adhesive layer 11.

In the modification shown in FIG. 9, the double-sided electrical debonding type adhesive sheet may be attached to the first adherend 15 on the surface on the side of one second adhesive layer 13, and may be attached to the second adherend 16 on the surface on the side of the other second adhesive layer 13.

As in the modification shown in FIG. 9, the substrate for voltage application may have a laminated structure including the coating layer 12*c*, the conductive layer 12*a*, and the substrate layer 12*b*. In addition, the substrate for voltage application may have a laminated structure including a coating layer and a conductive layer. Similarly to the electrical debonding type adhesive sheet shown in FIG. 8, the electrical debonding type adhesive sheet in the modification shown in FIG. 9 may have the extending portion 17 that extends and is exposed from one side of the substrate for voltage application 12 and the adherend 15 in the surface spreading direction.

The unexposed portion of the conductive layer 12*a* may be covered with the coating layer 12*c* as shown in FIG. 9. In addition, the conductive layer 12*a* in the extending portion 17 is preferably not exposed, and may be covered with the coating layer 12*c*.

(Adhesive Force of Adhesive Sheet)

From the viewpoint of realizing a good adhesive force, the 180° peel adhesive force (application to SUS304 plate, pulling speed: 300 mm/min, debonding temperature: 23° C.) of the first adhesive layer 11 of the adhesive sheet 10 is preferably 1.0 N/10 mm or more, more preferably 2.0 N/10 mm or more, and still more preferably 3.0 N/10 mm or more. The upper limit is not limited, but is usually 20 N/10 mm or less.

In addition, from the same viewpoint, the 180° peel adhesive force (application to SUS304 plate, pulling speed: 300 mm/min, debonding temperature: 23° C.) of the second adhesive layer 13 of the adhesive sheet 10 is preferably 1.0 N/10 mm or more, more preferably 2.0 N/10 mm or more, and still more preferably 3.0 N/10 mm or more. The upper limit is not limited, but is usually 20 N/10 mm or less.

The 180° peel adhesive force of the adhesive sheet 10 can be measured, for example, in the following manner in accordance with JIS Z 0237.

First, for the adhesive sheet 10 which is covered on both sides with separators, one of the separators is peeled off, and a polyethylene terephthalate (PET) film having a thickness of 50 μm is thereafter adhered to the exposed adhesive surface to line the adhesive sheet 10. Next, a test piece [10 mm (width)×100 mm (length)] is cut out of the lined adhesive sheet 10. Subsequently, the other separator is peeled from this test piece and the test piece is then applied to a stainless-steel plate (SUS304) as an adherend. Thereafter, the test piece is allowed to press-bond to the adherend by rolling a 2 kg roller thereon forward and backward once. This specimen is allowed to stand still for 30 minutes and then examined for 180° peel adhesive force (pulling speed: 300 mm/min, debonding temperature: 23° C.) using a peel tester (trade name "Variable-Angle Peel Tester YSP", manufactured by Asahi Seiko Co., Ltd.).

In addition, from the viewpoint of realizing good electrical debonding properties, the 180° peel adhesive force (application to SUS304 plate, pulling speed: 300 mm/min, debonding temperature: 23° C.) of the first adhesive layer 11 of the adhesive sheet 10 after voltage application is preferably 1.0 N/10 mm or less, more preferably 0.5 N/10 mm or less, and still more preferably 0.2 N/10 mm or less. The lower limit is not limited, but is usually 0.01 N/10 mm or more.

The 180° peel adhesive force after the voltage application is a 180° peel adhesive force (pulling speed: 300 mm/min, debonding temperature: 23° C.) measured by applying a voltage of 10 V for 10 seconds after the test piece and the adherend are allowed to press-bond to each other and left to stand for 30 minutes as described above and by using a peel tester with the voltage applied.

In addition, the 180° peel adhesive force (hereinafter also referred to as "adhesive force after voltage application") of the first adhesive layer 11 after voltage application is preferably sufficiently lower than the 180° peel adhesive force (hereinafter also referred to as "initial adhesive force") of the first adhesive layer 11. A rate of decrease in adhesive force obtained by the following formula (C) is preferably 60% or more, more preferably 70% or more, and still more preferably 80% or more.

$$\text{Rate of decrease in adhesive force (\%)}=\{1-(\text{adhesive force after voltage application}/\text{initial adhesive force})\}\times 100 \quad \text{(C)}$$

(Method for Producing Adhesive Sheet)

In the production of the adhesive sheet 10, for example, first, an adhesive composition (first composition) for forming the first adhesive layer 11 and an adhesive composition (second composition) for forming the second adhesive layer 13 are respectively prepared. Next, the first composition is applied to the conductive layer 12*a* of the substrate for voltage application 12 and then dried. Accordingly, the first adhesive layer 11 is formed. Next, the second composition is applied to the surface of the substrate for voltage application 12 on the side opposite to the first adhesive layer 11 and then dried. Accordingly, the second adhesive layer 13 is formed. For example, the adhesive sheet 10 can be produced in this manner.

Alternatively, the adhesive sheet 10 may be produced by a so-called transfer method. Specifically, first, the first adhesive layer 11 and the second adhesive layer 13 are each formed on a separator (debonding liner). The first adhesive layer 11 is formed by applying the first composition for forming the first adhesive layer 11 to a surface subjected to a debonding treatment of a predetermined separator to form a coating film, and then drying the coating film. The second adhesive layer 13 is formed by applying the second composition for forming the second adhesive layer 13 to a surface subjected to a debonding treatment of a predetermined separator to form a coating film, and then drying the coating film. Next, the first adhesive layer 11 attached to the separator is allowed to bond to the conductive layer 12*a* of the substrate for voltage application 12. Subsequently, the second adhesive layer 13 attached to the separator is allowed to bond to the surface of the substrate for voltage application 12 on the side opposite to the first adhesive layer 11. For example, the adhesive sheet 10 can be produced in this manner.

In the modification shown in FIG. 8, for example, the surface on the first adhesive layer 11 side of the adhesive sheet 10 produced by the above method is allowed to bond to the surface on the conductive layer 12*a* side of the substrate for voltage application 12. Next, the first adhesive layer 11 attached to the separator is allowed to bond to the surface on the substrate layer 12*b* side of the substrate for voltage application 12. For example, the double-sided electrical debonding type adhesive sheet shown in FIG. 8 can be produced in this manner.

In the modification shown in FIG. 9, similarly to the double-sided electrical debonding type adhesive sheet shown in FIG. 8, for example, the surface on the first adhesive layer 11 side of the electrical debonding type adhesive sheet shown in FIG. 7 is allowed to bond to the surface on the coating layer 12*c* side of the substrate for voltage application 12 including the coating layer 12*c*. Next, the first adhesive layer 11 attached to the separator is allowed to bond to the surface on the substrate layer 12*b* side of the substrate for voltage application 12. For example, the double-sided electrical debonding type adhesive sheet shown in FIG. 9 can be produced in this manner.

[Joined Body and Method for Separating Joined Body]

First Embodiment

Next, a joined body and a method for separating the joined body according to a first embodiment will be described.

The joined body according to the present embodiment is a joined body comprising: an electrical debonding type adhesive sheet comprising a substrate for voltage application comprising a conductive layer, a first adhesive layer comprising an electrically debondable adhesive, the first adhesive layer being formed on the conductive layer of the substrate for voltage application, and a second adhesive layer formed on a surface of the substrate for voltage application opposite to the first adhesive layer; a first adherend attached to the first adhesive layer of the electrical debonding type adhesive sheet; and a second adherend attached to the second adhesive layer of the electrical debonding type adhesive sheet, wherein at least a portion of the first adherend to which the first adhesive layer is attached has conductivity, and the electrical debonding type adhesive sheet has, on at least one surface of the electrical debonding type adhesive sheet, an electrode contact portion, which is a portion to which an adherend is not attached, and a surface of the electrode contact portion to which the adherend is not attached has a portion where the conductive layer is not exposed in at least a part of the surface of the electrode contact portion.

That is, the joined body of the present embodiment is a joined body in which the first adherend and the second adherend are joined to each other with the above-described adhesive sheet.

When the joined body of the present embodiment is separated, an electrode is brought into contact with the first adherend and the conductive layer, a voltage is applied to the first adhesive layer to reduce an adhesive force of the first adhesive layer, and the first adherend is separated from the first adhesive layer by debonding. When the electrode is to be brought into contact with the conductive layer, at the electrode contact surface in the electrode contact portion, the electrode is allowed to penetrate through the layer covering the conductive layer, such that the electrode is brought into contact with the conductive layer. That is, for example, in the example shown in FIG. 3, the electrode is allowed to penetrate through the first adhesive layer 11, such that the electrode is brought into contact with the conductive layer 12*a*. In addition, in the example shown in FIG. 6, the electrode is allowed to penetrate through the second adhesive layer 13 and the substrate layer 12*b*, such that the electrode is brought into contact with the conductive layer 12*a*.

The materials of the first adherend and the second adherend are not limited. It is sufficient that at least a portion of the first adherend to which the first adhesive layer is attached has conductivity, a portion of the first adherend to which the electrode is brought into contact has conductivity, and these portions are electrically connected to each other.

The voltage applied to the first adhesive layer at the time of separating the joined body is preferably 1 V or more, more preferably 3 V or more, more preferably 6 V or more, and still more preferably 10 V or more. In addition, the voltage is preferably 500 V or less, more preferably 300 V or less, still more preferably 100 V or less, and particularly preferably 50 V or less.

Within such a range, the separation operation of the joined body to be efficiently performed, and thus, this is preferable. For example, within such a range, an easily available thing such as a dry battery can be used as a power source of the voltage applying device.

In addition, an application time of the voltage to the first adhesive layer is preferably 300 seconds or less, more preferably 180 seconds or less, still more preferably 120 seconds or less, yet still more preferably 60 seconds or less, and particularly preferably 30 seconds or less.

Within such a range, the efficiency of the separation operation of the joined body is suitably improved.

Second Embodiment

Next, a joined body and a method for separating the joined body according to a second embodiment will be described.

The joined body according to the present embodiment is joined body comprising: an electrical debonding type adhesive sheet comprising a substrate for voltage application comprising a conductive layer, a first adhesive layer comprising an electrically debondable adhesive, the first adhesive layer being formed on the conductive layer of the substrate for voltage application, and a second adhesive layer formed on a surface of the substrate for voltage application opposite to the first adhesive layer; a first adherend attached to the first adhesive layer of the electrical debonding type adhesive sheet; and a second adherend attached to the second adhesive layer of the electrical debonding type adhesive sheet, wherein at least a portion of the first adherend to which the first adhesive layer is attached has conductivity, and the first adherend is attached to an entire surface of the electrical debonding type adhesive sheet on the first adhesive layer side, and the second adherend is attached to the entire surface of the electrical debonding type adhesive sheet on the second adhesive layer side.

That is, in the joined body of the present embodiment, the conductive layer is covered with the adherend until immediately before the electrical debonding and is not exposed to the outside, and thus, corrosion of the conductive layer is suppressed.

When the joined body of the present embodiment is separated, an electrode is brought into contact with the first adherend and the conductive layer, a voltage is applied to the first adhesive layer to reduce an adhesive force of the first adhesive layer, and the first adherend is separated from the first adhesive layer by debonding. When the electrode is to be brought into contact with the conductive layer, the electrode is allowed to penetrate through the first adherend or the second adherend, such that the electrode is brought into contact with the conductive layer.

The materials of the first and second adherends and the preferable ranges of the applied voltage and the voltage application time are the same as those in the first embodiment.

Third Embodiment

Next, a joined body and a method for separating the joined body according to a third embodiment will be described.

The joined body according to the present embodiment is a joined body comprising: an electrical debonding type adhesive sheet comprising, a substrate for voltage application comprising conductive layers on both surfaces of a first adhesive layer comprising an electrically debondable adhesive, and second adhesive layers formed on a surface of the substrate for voltage application opposite to the first adhesive layer; a first adherend attached to one second adhesive layer of the electrical debonding type adhesive sheet; and a second adherend attached to the other second adhesive layer of the electrical debonding type adhesive sheet, wherein the electrical debonding type adhesive sheet has, on at least one surface of the electrical debonding type adhesive sheet, an electrode contact portion, which is a portion to which an adherend is not attached, and a surface of the electrode contact portion to which the adherend is not attached has a portion where the conductive layer is not exposed in at least a part of the surface of the electrode contact portion.

That is, in the joined body of the present embodiment, the conductive layer is covered with the adherend until immediately before the electrical debonding and is not exposed to the outside, and thus, corrosion of the conductive layer is suppressed.

When the joined body of the present embodiment is separated, an electrode is brought into contact with the first adherend and the conductive layer, a voltage is applied to the first adhesive layer to reduce an adhesive force of the first adhesive layer, and the first adherend is separated from the first adhesive layer by debonding. When the electrode is to be brought into contact with the conductive layer, the electrode is allowed to penetrate through the first adherend or the second adherend, such that the electrode is brought into contact with at least one of the conductive layers.

The materials of the first and second adherends and the preferable ranges of the applied voltage and the voltage application time are the same as those in the first embodiment.

EXAMPLES

Hereinafter, the present invention will be specifically described with reference to Examples, but the present invention is not limited to these Examples.

(Production of Acrylic Polymer Solution)

Into a separable flask, 87 parts by mass of n-butyl acrylate (BA), 10 parts by mass of 2-methoxyethyl acrylate (MEA) and 3 parts by mass of acrylic acid (AA) as monomer components and 150 parts by mass of ethyl acetate as a polymerization solvent were charged and the mixture was stirred for 1 hour while introducing nitrogen gas. In this manner, oxygen in the polymerization system was removed, and then 0.2 parts by mass of 2,2'-azobisisobutyronitrile (AIBN) as a polymerization initiator was added to the mixture. The temperature was raised to 63° C. and a reaction was performed for 6 hours. Thereafter, ethyl acetate was added to the reaction product to obtain an acrylic polymer solution having a solid content concentration of 40% by mass.

Example 1

(Production of Electrical Debonding Type Adhesive Layer)

100 parts by mass of the acrylic polymer (solution) obtained above, 0.4 parts by mass of a crosslinking agent V-05, 4 parts by mass of an ionic liquid AS-110, additives (3 parts by mass of an adsorptive inhibitor of AMINE O, 0.3 parts by mass of an adsorptive inhibitor of Irgacor DSSG, and 0.8 parts by mass of a chelate-forming metal deactivator of Irgamet 30), and ethyl acetate were added, stirred, and mixed to obtain an electrically debondable adhesive composition (solution) adjusted to have a solid content concentration of 25% by mass.

The obtained electrically debondable adhesive composition (solution) was applied, using an applicator, onto a surface subjected to a debonding treatment of a polyethylene terephthalate separator ("MRF38" (trade name) manufactured by Mitsubishi Plastics, Inc.) whose surface was subjected to a debonding treatment so as to have a uniform thickness. Next, heat drying was performed at 150° C. for 3 minutes for the applied composition, and the surface subjected to a debonding treatment of the polyethylene terephthalate separator ("MRF38" (trade name) manufactured by Mitsubishi Plastics, Inc.) whose surface was subjected to a debonding treatment was laminated on the adhesive using a hand roller to obtain an electrical debonding type adhesive layer having a thickness of 50 μm.

The abbreviations of the ionic liquid, the crosslinking agent, the adsorptive inhibitor, and the chelate-forming metal deactivator in Table 1 are as follows.

(Ionic Liquid)

AS-110: cation: 1-ethyl-3-methylimidazolium cation, anion: bis(fluorosulfonyl)imide anion, trade name "ELEXCEL AS-110", manufactured by Daiichi Kogyo Seiyaku Co., Ltd.

(Crosslinking Agent)

V-05: polycarbodiimide resin, trade name "CARBODILITE V-05", manufactured by Nisshinbo Chemical Inc.

(Adsorptive Inhibitor)

AMINE O: 2-(8-heptadecen-1-yl)-4,5-dihydro-1H-imidazole-1-ethanol, trade name "AMINE O", manufactured by BASF Japan Ltd.

Irgacor DSSG: sodium sebacate, trade name "Irgacor DSSG", manufactured by BASF Japan Ltd.

(Chelate-Forming Metal Deactivator)

Irgamet 30: N,N-bis(2-ethylhexyl)-[(1,2,4-triazol-1-yl) methyl]amine, trade name "Irgamet 30", manufactured by BASF Japan Ltd.

(Production of Electrical Debonding Type Adhesive Sheet)

The polyethylene terephthalate separator (MRE38) of the obtained electrical debonding type adhesive layer was debonded, and a surface of a film (trade name "Metal Mie TS", manufactured by Toray Film Co., Ltd., thickness: 50 μm) having a metal layer, which was a laminate in which a conductive layer (metal layer (aluminum vapor deposition layer)) and a support substrate (polyethylene terephthalate (PET)) were laminated in this order, on a side of the conductive layer, was allowed to bond to the exposed surface of the electrical debonding type adhesive layer to obtain an electrical debonding type adhesive sheet.

(Production of Joined Body)

The polyethylene terephthalate separator (MRF38) of the electrical debonding type adhesive sheet was debonded, and a stainless-steel plate (SUS316, size: 30 mm×120 mm) as an adherend having conductivity was attached to the debonded surface of the electrical debonding type adhesive sheet such that one end of the electrical debonding type adhesive sheet protruded from the adherend by about 2 mm as shown in FIG. 3, and the laminate was pressed by reciprocating a 2 kg roller one time. After allowing to stand in an environment of 23° C. for 30 minutes, a joined body in which an unexposed portion of the conductive layer was covered with the electrical debonding type adhesive layer was obtained.

Example 2

An electrical debonding type adhesive layer was produced in the same manner as in Example 1, and the polyethylene terephthalate separator (MRE38) of the obtained electrical debonding type adhesive layer was debonded, and a surface of a film (substrate for voltage application) (trade name "1005CR", manufactured by Toray Film Co., Ltd., thickness: 12 μm) having a resin coating layer and a metal layer, which was a laminate in which a resin coating layer (polyester-based resin layer), a conductive layer (metal layer (aluminum vapor deposition layer)), and a support substrate (PET) were laminated in this order, on a side of the resin coating layer, was attached to the debonded surface of the electrical debonding type adhesive layer such that one end of the laminate protruded from the electrical debonding type adhesive layer by about 2 mm as shown in FIG. 7, thereby obtaining an electrical debonding type adhesive sheet.

As an adherend, a stainless-steel plate (SUS316, size: 30 mm×120 mm) was prepared as a conductive adherend.

The polyethylene terephthalate separator (MRF38) of the electrical debonding type adhesive sheet obtained above was debonded, the adherend having conductivity was attached to the debonded surface on the electrical debonding type adhesive layer side, and the laminate was pressed by reciprocating a 2 kg roller one time. After allowing to stand in an environment of 23° C. for 30 minutes, a joined body in which an unexposed portion of the conductive layer was covered with the resin coating layer was obtained.

Example 3

A film (trade name "Metal Mie TS", manufactured by Toray Film Co., Ltd., thickness: 50 μm) having a metal layer, which was a laminate in which a conductive layer (metal layer (aluminum vapor deposition layer)) and a support substrate (polyethylene terephthalate (PET)) were laminated in this order, was prepared.

Next, a Si target (AC: 40 kHz) was attached to an AC sputtering device, and sputtering was performed while introducing $O_2$ gas and $N_2$ gas, thereby forming an inorganic coating layer ($SiN_x$ layer) having a thickness of 50 nm on the metal layer of the film having the metal layer, and thus, a substrate A was produced. The temperature of the film having the metal layer at the time of forming the $SiN_x$ layer was set to −8° C.

The polyethylene terephthalate separator (MRE38) of the electrical debonding type adhesive layer produced in the same manner as in Example 1 was debonded, and the surface of the substrate A on the inorganic coating layer side was attached to the debonded surface on the electrical debonding type adhesive layer side such that one end of the substrate A protruded from the electrical debonding type adhesive layer by about 2 mm as shown in FIG. 7 to obtain an electrical debonding type adhesive sheet.

In the same manner as in Example 2, the adherend having conductivity was attached to the electrical debonding type adhesive sheet to obtain a joined body in which an unexposed portion of the conductive layer was covered with the inorganic coating layer.

Example 4

A film (trade name "Metal Mie TS", manufactured by Toray Film Co., Ltd., thickness: 50 μm) having a metal layer, which was a laminate in which a conductive layer (metal layer (aluminum vapor deposition layer)) and a support substrate (polyethylene terephthalate (PET)) were laminated in this order, was prepared.

Next, a nickel (Ni) target was attached to an AC sputtering device (AC: 40 kHz), and sputtering was performed while introducing Ar gas, thereby forming a metal layer (Ni layer) having a thickness of 100 nm on an ITO layer and thus a substrate B was produced. The temperature of the substrate film at the time of forming the Ni layer was set to −8° C.

An electrical debonding type adhesive sheet and a joined body of Example 4 were obtained in the same manner as in Example 3 except that the substrate A was changed to the substrate B.

Examples 5 and 6

Electrical debonding type adhesive sheets and joined bodies of Examples 5 and 6 were obtained in the same manner as in Example 3 except that the thickness of the inorganic coating layer was changed to 100 nm and 200 nm, respectively.

Comparative Example 1

An electrical debonding type adhesive layer was produced in the same manner as in Example 1, the polyethylene terephthalate separator (MRE38) of the obtained electrical debonding type adhesive layer was debonded, and a stainless-steel plate (SUS316, size: 30 mm×120 mm) as an adherend having conductivity was attached to the debonded surface of the electrical debonding type adhesive layer to obtain a laminate.

As a substrate, a film (trade name "Metal Mie S", manufactured by Toray Film Co., Ltd., thickness: 50 μm) having a metal layer, which was a laminate in which a conductive layer (metal layer (aluminum vapor deposition layer)) and a support substrate (polyethylene terephthalate (PET)) were laminated in this order, was prepared.

Figure 2:
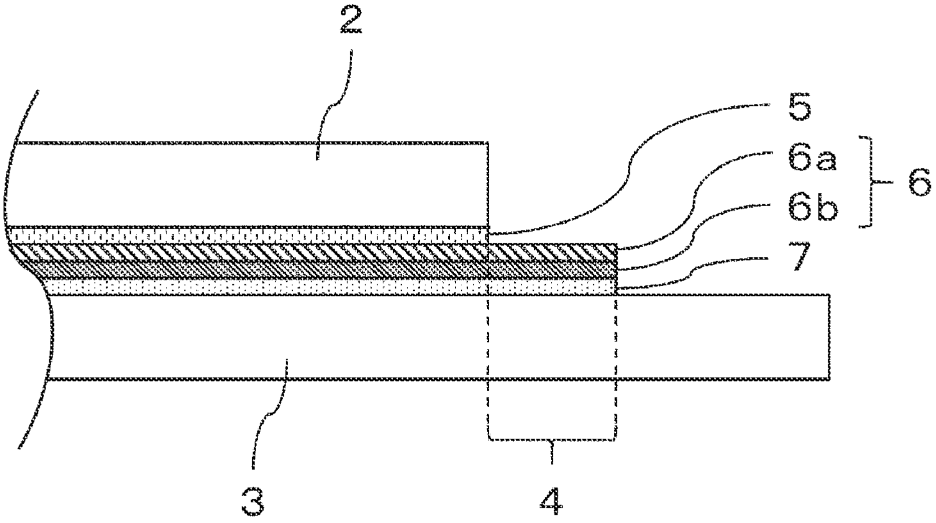
FIG. 2 is an enlarged schematic side view of a periphery of an electrode contact portion in an electrical debonding type adhesive sheet in the related art.

The polyethylene terephthalate separator (MRF38) of the laminate obtained above was debonded, and the surface of the substrate on the conductive layer side was attached to the debonded surface on the electrical debonding type adhesive layer side such that one end of the substrate protruded from the laminate by about 2 mm as shown in FIG. 2, and was pressed by reciprocating a 2 kg roller one time. After allowing to stand in an environment of 23° C. for 30 minutes, a joined body was obtained in which at least a part of the surface of the electrode contact portion to which the adherend was not attached did not have a portion where the conductive layer was not exposed.

<Corrosion Evaluation>

The joined bodies obtained in Examples 1 to 6 and Comparative Example 1 were stored in a thermo-hygrostat set at a temperature of 60° C. and a humidity of 90% for one week, and then the presence of corrosion of the conductive layer was visually evaluated. In the corrosion evaluation, the presence of corrosion was visually determined.

The results obtained for Examples 1 to 4 and Comparative Example 1 are shown in Table 1. In Examples 5 and 6, corrosion was "absent".

TABLE 1

| | Comparative Example 1 | Example 1 | Example 2 | Example 3 | Example 4 |
|---|---|---|---|---|---|
| Substrate | Metal Mie S | Metal Mie TS | 1005CR | Substrate A | Substrate B |
| Layer structure | PET/Aluminum vapor deposition layer | PET/Aluminum vapor deposition layer | PET/Aluminum vapor deposition layer/Polyester-based coating layer | PET/Aluminum vapor deposition layer/SiNx sputtered layer | PET/Aluminum vapor deposition layer/Ni sputtered layer |
| Type of coating layer | No | No | Resin coating layer | Inorganic coating layer | Inorganic coating layer |
| Presence of corrosion | Yes | No | No | No | No |

Although preferred embodiments of the present invention have been described above, the present invention is not limited to the above embodiments, and various modifications and substitutions can be added to the above embodiments without departing from the scope of the present invention.

REFERENCE SIGNS LIST

1: electrical debonding type adhesive sheet
2, 3: adherend
4: electrode contact portion
5: electrical debonding type adhesive layer
6: substrate
6*a*: conductive layer
6*b*: substrate layer
7: adhesive layer
10: electrical debonding type adhesive sheet
11: first adhesive layer
12: substrate for voltage application
12*a*: conductive layer
12*b*: substrate layer
12*c*: coating layer
13: second adhesive layer
14: electrode contact portion
15: first adherend
16: second adherend
17: extending portion
20: electrical debonding type adhesive sheet
21: first adhesive layer
22: substrate for voltage application
22*a*: conductive layer
23: second adhesive layer
24: electrode contact portion
25: first adherend
26: second adherend

The invention claimed is:

1. An electrical debonding adhesive sheet comprising:
a substrate for voltage application comprising a conductive layer;
a first adhesive layer comprising an electrically debondable adhesive, the first adhesive layer being formed on the conductive layer of the substrate for voltage application; and
a second adhesive layer formed on a surface of the substrate for voltage application opposite to the first adhesive layer, wherein
the electrical debonding adhesive sheet has, on at least one surface of the electrical debonding adhesive sheet, an electrode contact portion, which is a portion to which an adherend is not attached, and
a surface of the electrode contact portion to which the adherend is not attached has a has an unexposed portion where the conductive layer is not exposed in at least a part of the surface of the electrode contact portion,
wherein
the electrical debonding adhesive sheet is not in a state where an electrical connection is implemented,
the substrate for voltage application further includes a coating layer, and
the unexposed portion where the conductive layer is not exposed is covered with the coating layer.

2. The electrical debonding adhesive sheet according to claim 1, wherein
one surface of the conductive layer of the substrate for voltage application is not exposed on the entire surface and the opposite surface of the conductive layer of the substrate for voltage application has at least a portion an unexposed portion where the conductive layer is not exposed.

3. An electrical debonding adhesive sheet comprising:
a substrate for voltage application comprising a conductive layer;
a first adhesive layer comprising an electrically debondable adhesive, the first adhesive layer being formed on the conductive layer of the substrate for voltage application; and
a second adhesive layer formed on a surface of the substrate for voltage application opposite to the first adhesive layer, wherein
the conductive layer is not exposed on an entire surface on the first adhesive layer side and an entire surface on the second adhesive layer side,
the electrical debonding adhesive sheet has an electrode contact portion to which an adherend is not attached, and
a surface of the electrode contact portion to which the adherend is not attached has a has an unexposed portion where the conductive layer is not exposed in at least a part of the surface of the electrode contact portion,
wherein
the electrical debonding adhesive sheet is not in a state where an electrical connection is implemented,
the substrate for voltage application further includes a coating layer, and
the unexposed portion where the conductive layer is not exposed is covered with the coating layer.

4. A joined body comprising:

an electrical debonding adhesive sheet comprising:

a substrate for voltage application comprising a conductive layer;

a first adhesive layer comprising an electrically debondable adhesive, the first adhesive layer being formed on the conductive layer of the substrate for voltage application; and a second adhesive layer formed on a surface of the substrate for voltage application opposite to the first adhesive layer;

a first adherend attached to the first adhesive layer of the electrical debonding adhesive sheet; and a second adherend attached to the second adhesive layer of the electrical debonding adhesive sheet, wherein at least a portion of the first adherend to which the first adhesive layer is attached has conductivity, the electrical debonding adhesive sheet has, on at least one surface of the electrical debonding adhesive sheet, an electrode contact portion, which is a portion to which an adherend is not attached, and a surface of the electrode contact portion to which the adherend is not attached has a has an unexposed portion where the conductive layer is not exposed in at least a part of the surface of the electrode contact portion, wherein the electrical debonding adhesive sheet is not in a state where an electrical connection is implemented, the substrate for voltage application further includes a coating layer, and the unexposed portion where the conductive layer is not exposed is covered with the coating layer.

5. The joined body according to claim 4, wherein one surface of the conductive layer of the substrate for voltage application is not exposed on the entire surface and the opposite surface of the conductive layer of the substrate for voltage application has at least a portion an unexposed portion where the conductive layer is not exposed.

6. A method for separating the joined body according to claim 4, the method comprising:

in the unexposed portion of the surface of the electrode contact portion to which the adherend is not attached and where the conductive layer is not exposed, allowing an electrode to penetrate through a layer covering the conductive layer the coating layer to bring the electrode into contact with the conductive layer, and applying a voltage to the first adhesive layer.

7. A joined body comprising:

an electrical debonding adhesive sheet comprising:

a substrate for voltage application comprising a conductive layer;

a first adhesive layer comprising an electrically debondable adhesive, the first adhesive layer being formed on the conductive layer of the substrate for voltage application; and a second adhesive layer formed on a surface of the substrate for voltage application opposite to the first adhesive layer;

a first adherend attached to the first adhesive layer of the electrical debonding adhesive sheet; and a second adherend attached to the second adhesive layer of the electrical debonding adhesive sheet, wherein at least a portion of the first adherend to which the first adhesive layer is attached has conductivity, the first adherend is attached to an entire surface of the electrical debonding adhesive sheet on the first adhesive layer side, the second adherend is attached to the entire surface of the electrical debonding adhesive sheet on the second adhesive layer side, the electrical debonding adhesive sheet has an electrode contact portion to which an adherend is not attached, and a surface of the electrode contact portion to which the adherend is not attached has a has an unexposed portion where the conductive layer is not exposed in at least a part of the surface of the electrode contact portion, wherein the electrical debonding adhesive sheet is not in a state where an electrical connection is implemented, the substrate for voltage application further includes a coating layer, and the unexposed portion where the conductive layer is not exposed is covered with the coating layer.

8. A method for separating the joined body according to claim 7, the method comprising:

allowing an electrode to penetrate through the first adherend or the second adherend to bring the electrode into contact with the conductive layer and applying a voltage to the first adhesive layer.

9. A joined body comprising:

an electrical debonding adhesive sheet comprising:

a substrate for voltage application comprising conductive layers on both surfaces of a first adhesive layer comprising an electrically debondable adhesive; and second adhesive layers formed on a surface of the substrate for voltage application opposite to the first adhesive layer;

a first adherend attached to one second adhesive layer of the electrical debonding adhesive sheet; and a second adherend attached to the other second adhesive layer of the electrical debonding adhesive sheet, wherein the electrical debonding adhesive sheet has, on at least one surface of the electrical debonding adhesive sheet, an electrode contact portion, which is a portion to which an adherend is not attached, and a surface of the electrode contact portion to which the adherend is not attached has a has an unexposed portion where the conductive layer is not exposed in at least a part of the surface of the electrode contact portion, wherein the electrical debonding adhesive sheet is not in a state where an electrical connection is implemented, the substrate for voltage application further includes a coating layer, and the unexposed portion where the conductive layer is not exposed is covered with the coating layer.

10. A method for separating the joined body according to claim 9, the method comprising:

allowing an electrode to penetrate through the first adherend or the second adherend to bring the electrode into contact with at least one of the conductive layers and applying a voltage to the first adhesive layer.

* * * * *